United States Patent [19]

Mieuli, Jr.

[11] 3,974,915

[45] Aug. 17, 1976

[54] BASIC FOUNDATION FOR FLORAL ARRANGEMENTS

[76] Inventor: Jack Mieuli, Jr., 6495 Camelia Drive, San Jose, Calif. 95120

[22] Filed: June 23, 1975

[21] Appl. No.: 589,451

[52] U.S. Cl. ............................. 206/423; 206/45.26; 248/459
[51] Int. Cl.² ................... B65D 85/50; B65D 85/52; B65D 25/24; B65D 5/52
[58] Field of Search ......... 248/459; 206/423, 45.24, 206/45.27

[56] References Cited
UNITED STATES PATENTS

| | | | |
|---|---|---|---|
| 1,064,813 | 6/1913 | Bloomberg | 206/423 |
| 1,577,001 | 3/1926 | Snider | 248/459 |
| 2,340,373 | 2/1944 | Gardner | 206/423 |
| 3,298,512 | 1/1967 | Crane | 206/423 |

*Primary Examiner*—William Price
*Assistant Examiner*—Douglas B. Farrow
*Attorney, Agent, or Firm*—Leslie M. Hansen

[57] ABSTRACT

A flat panel of semi rigid paper board of biodegradeable material pre cut, die punched and bendable at strategic locations as a foundation and/or mounting for cut flowers and other floral supplies enabling creation of a variety of floral arrangements, large or small as either a wall hanging, a basket of flowers or a free standing easel.

9 Claims, 7 Drawing Figures

U.S. Patent   Aug. 17, 1976   3,974,915
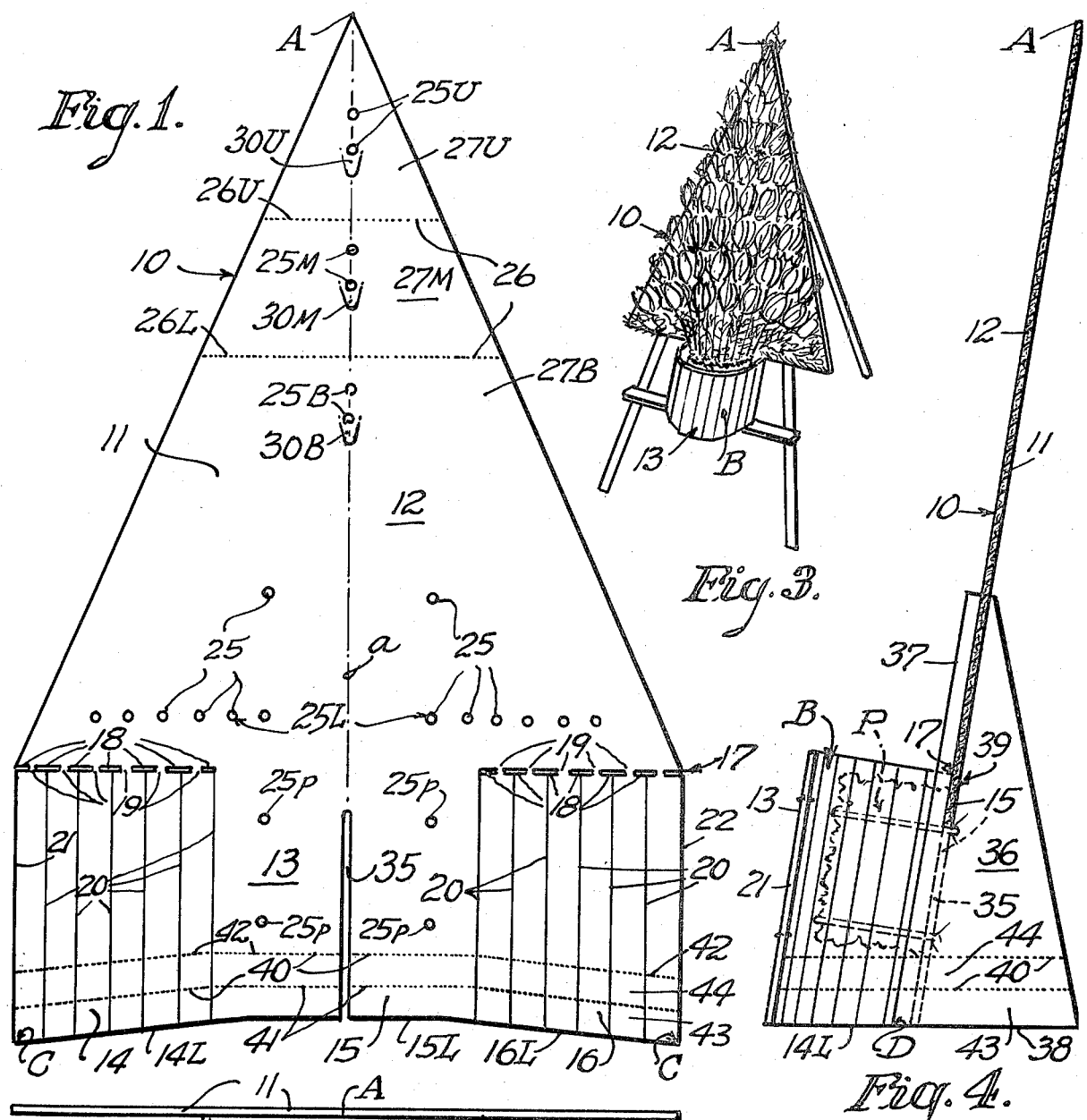

BASIC FOUNDATION FOR FLORAL ARRANGEMENTS

This invention relates to a basic foundation for floral arrangements and particularly to a unitary structure adapted to be formed into various designs and/or patterns suitable to display various types of flowers in their most spectacular and effective aesthetic array.

BACKGROUND

The floral industry has long been involved in the use of floral supplies in the form of accessories such as wreath foundations, stands, wires, baskets, reeds, picks and hidden devices supplemental to the provision and sales of the flowers themselves. Heretofore, many of such floral supplies have been of such value as to merit reclamation of the foundations for use over and over again. Much of the material unclaimable has to be disposed of by fire or relegated to junk heaps if non-combustible. Moreover, such accessories are heavy and bulky, i.e., not easily handleable in the course of building flower arrangements on or about them. Their bulkiness also requires a great deal of storage space in shops and shipping containers in the sales and distribution thereof as floral supplies.

The present invention seeks to overcome such objectionable features and characteristics in a foundation for floral arrangements. To that end, the present invention contemplates the provision of a simple unitary foundation form which can be mass produced from a biodegradeable material which is light in weight, easily handleable as well as disposable and/or recycleable.

THE PRESENT INVENTION

It is one object of the present invention to provide a simple, flat basic form of relatively stiff biodegradeable material such as corrugated board or paper. In conjunction with this object, it is another object to provide such a form which can be easily made by mass production.

It is another object to provide such mass produced forms in flat condition for compact packaging in numbers. This object contemplates the advantage of space saving, not only in shippment as a supply, but also to enable florists to store and keep a good supply on hand in a minimum of storage space in their shops.

It is yet another object of this invention to provide in such flat forms cuts, perforations and holes or apertures so located as to lend to various shapes and designs of a foundation upon which to mount and secure floral arrangements.

It is still another object to provide in such flat forms, a plurality of crease lines arranged in equally spaced parallel relation on each side of a medial portion of its lower region. These crease lines extend vertically and when selectively bent are adapted to form a basket-like container at the bottom edge of basic form. In this connection, variations in shapes of the basket is made possible by the particular selection and or bend made in such crease lines during the formation of a basket-like form thereto.

It is a still further object to provide such a basic form of sufficient height to support tall flower arrangements. This object further includes the provision of a series of lines of perforations in space relation transversely of the upper end of the basic form to shorten the form down to a height suitable for the flower arrangement intended to be created.

In any of the particular designs above explained there is a provision of apertures prepunched through the basic form at strategic locations for the pass-through of wires and the like by which flowers may be secured to the particular form or foundation for the flower arrangement intended to be made up.

These and other objects and advantages of the present invention will become more apparent from a reading of the following detailed description in the light of the accompanying drawing in which:

FIG. 1 is a straight forward elevational view of the flat basic form embodiment of the present invention;

FIG. 2 is a plan view of FIG. 1 having its lower portion with its creased lateral sides bent into the form of a half round basket-like container;

FIG. 3 is a perspective view at reduced scale of the basic form of FIG. 1 with the basket-like bottom container supported on a stand or easel, the view depicting flowers arranged on the form;

FIG. 4 is a longitudinal vertical section through FIG. 1 with a back brace for the form to provide an easel-like stand for table arrangements;

FIG. 5 is a plan view of the lower basket-like portin of the basic form with the crease lines of the lateral sides so bent as to provide a rectangular container;

FIG. 6 is a plan view of the lower portion having the crease lines of its lateral sides bent to provide a triangular shape to the basket-like container;

FIG. 7 is a perspective view of the basic form foreshortened in height and provided with a bow-like handle for the basket-like container.

GENERAL DESCRIPTION

Referring to FIG. 1 of the drawing, the invention is embodied in a flat basic form 10 of corrugated paper board and the like 11 of suitable rigidity. The form 10 as noted in FIG. 1 is precut to provide an upper portion 12 shaped as an isosceles triangle and integral to a lower base portion 13 of a substantially rectangular shape. Basic forms such as the one 10 are of a shape so formed as to enable the cutting of numerous basic forms inversely from a continuous strip of corrugated board with a minimum loss to material as scrap. Each basic form 10, thus cut from a continuous sheet or strip of currugated board 11, is then or simultaneously stamped in a particular manner to provide a basic foundation for floral arrangements in accordance with the present invention.

DETAILED DESCRIPTION OF THE INVENTION

The basic form 10 has its lower base portion divided transversely into three zones 14, 15 and 16, the zones 14 and 16 being laterally of the medial zone 15. The lateral zones 14 and 16 are substantially severed from the upper triangular portion 12 of the form 10 along the base line 17 of the isosceles triangular shape thereof. The severence of lateral zones 14 and 16 may be a full cut through the board material 11 or, as shown in FIG. 1, a series of elongated slots 18 die cut through the board 11 along the base line 17. This leaves connecting tabs 19 between the base of the upper portion and the lateral zones 14 and 16 to keep the latter flat and co-planar with the flat form 10 during storage, shipping and handling before the desired shape of floral arrangement is to be made up.

Each of the lateral zones 14 and 16 are provided with a plurality of crease lines or depressions 20 in parallel spaced relation to each other in a vertical direction common to the longitudinal axis *a* of the basic form 10. These crease lines 20 are equally spaced from each other between the outer edge 21–22 of the lateral zones 14 and 16. By this arrangement, selective bending of the laterals along the crease lines enables the formation of a basket-like closure or container B of a pad P to be secured to the medial portion 15 of the lower portion 13. Such pads P are of a porous material into which the stem of flowers or stalks may be inserted during the creation of a flower arrangement on the foundation form. The pads P may be a matty dried grass or straw, but preferably a styrafoam block commonly supplied for the purpose.

The board 11 has a plurality of holes 25 punched therethrough at strategic locations as pass-throughs for tie wires and the like for securing various parts of the flower arrangement, flowers and the like to the foundation form 10. At least two or more such holes 25p are provided in the lower portion 13 of the form 10 for securing a pad P thereto as indicated in dotted lines in FIG. 4. As shown in FIG. 1, the medial zone 15 of the lower base portion 13 has one such hole 25p formed adjacent each of its four corners. A plurality of such holes 25L are arranged in alignment parallel to and in spaced relation adjacent the lower base line 17 of the upper portion 12 of the form 10. An additional pair of such holes 25 A are provided on opposite sides of the longitudinal axis *a* of upper portion 12 and about one fifth the distance upwardly from the base line 17.

The isosceles triangular upper portion 12 is provided with lines of perforations 26 transverse to the axis *a* and parallel to the base line 17 of the upper portion. One upper line of perforations 26 U is spaced about one-fifth the altitude and down from the apex of the upper portion 12. A second or lower such line 26L is equally spaced from and below line 26U.

From the foregoing it will be appreciated that the triangular upper portion 12 is divided into several zones along its axis *a*, namely zones 27 U, 27 M and 27 B. Upper zone 27U is adjacent to and includes the apex A of the triangle at its top and the upper line of perforations 26U at its bottom. Zone 27B is adjacent to and includes the base line 17 at its bottom and the lower line of perforations 26L at its top. The medial zone 27M is between the two lines of perforations 26L and 26U. When cut or severed along either line of perforations 26L or 26U, the upper triangular portion 12 becomes truncated. By this arrangement, the upper portion 12 of the basic form 10 can be foreshortened as illustrated in FIG. 7.

In either form, full height or truncated, the upper portion 12 can be hung on a wall by the provision of a suitable push-out tab 30. Each zone 27U, 27B, and 27M is provided with such a tab 30U, 30B, and 30M respectively, for that purpose. In addition, thereto each zone 27U, 27B, and 27M also has formed therethrough, holes 25U, 25B and 25M, respectively. These holes 25U, 25B and 25M serve as passthroughs for wires to secure tall stemmed flowers to the form 10 or may be used to tie the upper bight of a handle H such as the one shown in FIG. 7 to the form if desired.

Other than a use of the form 10 as a foundation for a wall hanging or a basket, it may also be used as an easel as shown in FIG. 4. For this purpose, the lower base portion 13 has an elongated slot 35 formed therein along the axis *a* of the basic form. A back brace 36 has an edge 37 formed at an angle D less than 90° to its base 38. The brace 36 is of a material and thickness comparable to the paper board 11 of which the form 10 is made. The back brace 36 has sliding fit into the slot 35 and is provided with a comparable slot 39 at its upper end parallel to and adjacent its front edge 37. The slot 39 in the brace 36 embraces the basic form 10 above the slot 35, as shown in FIG. 4.

The lower portion 13 of the basic form 10 has its lateral zones 14 and 16 provided with a lower edge 14L and 16L, respectively, at an angle C relative to its respective outer edge 21 and 22 (FIG. 1). The angle C at each lower-outer corner of the zones 14 and 16 is substantially equal to the angle D between the front edge 37 and base 38 of the back brace 36. By this arrangement, the basket-like container formed at the lower end of the basic form 10, will have a bottom in alignment with the base 38 of the back brace 36 of the easle-type foundation (FIG. 4).

Irrespective of the particular type of design desired to be made, the lower portion 13 of the basic form 10 is provided with several lines of perforations 40. These lines of perforations 40 are likewise transverse to the longitudinal axis *a* of the basic form 10. As best seen in FIGS. 1 and 4, there are preferably at least two such lines of perforations 40; spaced. One of the lines of perforations 40 designated 41, is spaced from the lower edges 14L, 15L and 16L a distance substantially equal to the spaced relation fo the crease lines 20 from one another in the lateral zones 14 and 16 of the lower base portion 13. The other line of perforations 40 designated 42 is spaced from the perforated line 41 a distance equal to the spacing of the latter from the bottom edges 14L, 15L, and 16L of the portion 13. These lines of perforations 41 and 42 identify removable lower zones 43 and 44 facilitating a reduction in depth of the basket-like container B to be formed. Such reduction in depth of the basket-like container or closure B may be dictated by the length of stems on the flowers to be mounted or to conform to a foreshortening of the triangular upper portion 12 as previously explained.

Having thus described the basic foundation form for floral arrangements in specific detail and its universal adaptation to various floral designs, it will be appreciated that the same may be varied, modified and/or altered in many ways without departing from the spirit or scope of my invention therein as called for in the appended claims.

I claim:

1. A foundation form for floral arrangements comprising:
    a. a flat sheet of semi-rigid paper board having an isosceles triangular upper portion integral at its base line to a rectangular lower base portion of lesser dimension altitudinally than the upper portion;
    b. a pair of slits formed along the base line and inwardly from the outer ends thereof a distance approximately one-third the length of the base line for dividing said rectagular base portion into a medial zone integral to said triangular upper portion and flanked by identical lateral zones severable therefrom;
    c. a plurality of equally spaced crease lines formed in each of said lateral zones parallel to the altitudinal axis of said flat sheet and between said medial zone and the side edges of said rectangular base portion, said lateral zones being bendable along their crease lines and adapted to have their side edges secured together in the form of a basket-like closure below the base line of said triangular upper portion; and d. punched out holes formed through said medial portion adapted to receive wires therethrough for securing flower stems and the like thereto within the basket-like closure.

2. A foundation form for floral arrangements in accordance with claim 1 including a line of perforations formed transversely across the lower base portion in spaced relation to the bottom edge thereof substantially comparable to the spacing of the crease lines in the lateral zones of the lower-base portion and the basket-like container adapted to be formed thereof.

3. A foundation form for floral arrangements in accordance with claim 2 including one or more said lines of tear-off perforations equally spaced from one another.

4. A foundation form for floral arrangements in accordance with claim 2 in which the medial zone of said lower base portion has a bottom edge a lesser distance from the base line of said triangular upper portion than the outer side edges of the lateral zones and the bottom edges of each of said lateral zones thereof extend from the medial zone toward the outer side edges of the lower base portion and at an obtuse angle relative to the side edge; the combination therewith of an elongated slot formed vertically of the medial zone along the altitudinal axis of said flat form; a semi-rigid brace member of isosceles triangular shape having at last one of its sides at an angle to its base substantially the same as the obtuse angle between the bottom edge of said lateral zones and the outer side edges of said lower base portion; and an elongated slot formed in said brace member inwardly of and parallel to the said one side edges thereof from its upper end to a depth spaced from its bottom edge identical to the length of the slot in the medial zone for receiving and embracing the flat sheet above the slot formed in the medial zone and for aligning the bottom edge of the brace member with the bottom edges of the lateral zones when in the shape of a basket-like container.

5. The flat foundation form for floral arrangements in accordance with claim 1 including a plurality of punched-out wire receiving holes formed through the medial zone of the lower base portion, at least one such punched-out hole adjacent the corners of said medial zone facilitation the mounting of a flower stem receiving pad and the like thereto within a basket-like container formed thereon.

6. The flat foundation form for floral arrangements in accordance with claim 5 including a plurality of punched-out holes formed through the triangular upper portion in equal spaced relation and vertical alignment with the punched-out holes formed in the medial zone of the lower base portion thereof.

7. The flat foundation form for floral arrangements in accordance with claim 6 including a plurality of punched-out holes formed through the triangular upper portion normal to its longitudinal axis and adjacent its lower base line.

8. The flat foundation form for floral arrangements in accordance with claim 1 including one or more lines of perforations formed through said flat sheet normal to the altitudinal axis and more closely spaced from the apex and of the triangular upper portion facilitating truncation shortening of the latter.

9. The flat foundation form for floral arrangement in accordance with claim 8 including punched-out tabs formed in said flat sheet along the altitudinal axis and adjacent the upper end thereof.

* * * * *